US012724035B2

(12) United States Patent
Thor et al.

(10) Patent No.: US 12,724,035 B2
(45) **Date of Patent: *Sep. 1, 2026**

(54) OPTICAL ENCODER WITH COMPARATOR HYSTERESIS CHANGED WITH ROTATING SPEED AND OPERATING METHOD THEREOF

(71) Applicant: PixArt Imaging Inc., Hsin-Chu County (TW)

(72) Inventors: Chung-Min Thor, Penang (MY); Kuan-Choong Shim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 57 days.

This patent is subject to a terminal disclaimer.

(21) Appl. No.: 18/970,976

(22) Filed: Dec. 6, 2024

(65) Prior Publication Data

US 2025/0093378 A1 Mar. 20, 2025

Related U.S. Application Data

(63) Continuation of application No. 18/528,828, filed on Dec. 5, 2023, now Pat. No. 12,203,956, which is a continuation of application No. 17/582,194, filed on Jan. 24, 2022, now Pat. No. 11,885,828, which is a continuation-in-part of application No. 17/240,140, filed on Apr. 26, 2021, now Pat. No. 11,644,345.

(51) Int. Cl.

| | |
|---|---|
| ***G01P 3/486*** | (2006.01) |
| ***G01D 5/249*** | (2006.01) |
| ***G01D 5/34*** | (2006.01) |
| ***G01D 5/347*** | (2006.01) |
| ***G01P 3/36*** | (2006.01) |

(52) U.S. Cl.

CPC ................ *G01P 3/486* (2013.01); *G01P 3/36* (2013.01); *G01D 5/249* (2013.01); *G01D 5/34* (2013.01); *G01D 5/34715* (2013.01)

(58) Field of Classification Search

CPC ........... G01P 3/486; G01P 3/36; G01D 5/249; G01D 5/34; G01D 5/34715

See application file for complete search history.

(56) References Cited

U.S. PATENT DOCUMENTS

| | | | | |
|---|---|---|---|---|
| 4,808,933 A * | 2/1989 | Kobayashi | G01P 3/46 324/161 |
| 4,926,104 A * | 5/1990 | King | H02M 7/53875 318/599 |
| 5,019,773 A * | 5/1991 | Sugiura | G01P 3/489 702/145 |
| 11,333,532 B1 * | 5/2022 | Shim | G01D 5/24466 |
| 11,885,828 B2 * | 1/2024 | Thor | G01P 3/486 |
| 12,117,318 B2 | 10/2024 | Thor et al. | |

(Continued)

*Primary Examiner* — Jennifer D Bennett

(74) *Attorney, Agent, or Firm* — WPAT, PC

(57) ABSTRACT

There is provided an optical encoder including a phase shifter circuit and a multiple hysteresis comparators. The phase shifter circuit receives four input signals, and outputs multiple phase shifted signals based on the four input signals. Each of the multiple hysteresis comparators uses a changeable operation hysteresis level to compare a couple of phase shifted signals among the multiple phase shifted signals, wherein the changeable operation hysteresis level is determined corresponding to a signal frequency of the four input signals.

20 Claims, 12 Drawing Sheets

(56) References Cited

U.S. PATENT DOCUMENTS

| | | | | |
|---|---|---|---|---|
| 12,203,956 | B2 * | 1/2025 | Thor | G01P 3/486 |
| 2007/0045525 | A1 * | 3/2007 | Tsai | G01D 5/24404<br>250/231.13 |
| 2009/0206244 | A1 | 8/2009 | Bahari et al. | |
| 2012/0104236 | A1 * | 5/2012 | Thor | H03M 1/203<br>250/208.6 |
| 2013/0049711 | A1 * | 2/2013 | Mirea | H02M 3/1563<br>323/234 |

* cited by examiner

OPTICAL ENCODER WITH COMPARATOR HYSTERESIS CHANGED WITH ROTATING SPEED AND OPERATING METHOD THEREOF

CROSS REFERENCE TO RELATED APPLICATION

The present application is a continuation application of U.S. patent application Ser. No. 18/528,828 filed on, Dec. 5, 2023, which is a continuation application of U.S. patent application Ser. No. 17/582,194 filed on, Jan. 24, 2022, which is a continuation-in-part application of U.S. patent application Ser. No. 17/240,140 filed on, Apr. 26, 2021, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical encoder and, more particularly, to an optical encoder that adopts additional control photodiodes for turning on and off gain regulation of the index output.

2. Description of the Related Art

Please refer to FIGS. 1 and 2, they are operational schematic diagrams of a conventional optical encoder. The optical encoder includes a light source 10, a substrate 20 and a code disk 30, wherein the substrate 20 is separated from the code disk 30 by a longitudinal distance (or Z distance). The longitudinal distance shown in FIG. 1 is smaller than that shown in FIG. 2. The substrate 20 is arranged with a position photodiode 21 and an index photodiode 23.

The longitudinal distance can be different due to the assembling process. Since an emission angle of the light source 10 is not changed, when the longitudinal distance is increased, light intensity of light reflected by the code disk 30 to the position photodiode 21 becomes lower, and light intensity of light reflected by the code disk 30 to the index photodiode 23 does not have a significant variation due to a longer distance from the light source 10, as shown in FIG. 3A. Because the output signal from the position photodiode 21 is for calculating a rotation angle of the code disk 30, fluctuation of the light intensity received thereby can degrade the calculation accuracy.

For keeping incident light intensity of the position photodiode 21 to be substantially identical, it is known that this can be achieved by regulating emission light intensity of the light source 10. For example, when the longitudinal distance is smaller, the emission light intensity of the light source 10 is decreased, or otherwise when the longitudinal distance is larger, the emission light intensity of the light source 10 is increased. In this way, the position photodiode 21 can output substantially identical photocurrent as shown in FIG. 3B.

However, the output photocurrent of the index photodiode 23 is then changed. For example, FIG. 3B shows that intensity of photocurrent outputted by the index photodiode 23 can have about 2.5 times of difference between longitudinal distances of 2.2 mm and 1 mm.

In FIG. 4, reference numerals 231L and 233L indicate voltage values respectively associated with two index photodiodes under a smaller longitudinal distance; and reference numerals 231H and 233H indicate voltage values respectively associated with the two index photodiodes under a larger longitudinal distance.

A pulse width of the index output is determined by voltage values converted from photocurrents outputted by the two index photodiode. It is seen from FIG. 4 that if emission light intensity of the light source 10 is adjusted corresponding to different longitudinal distances (referring to FIG. 3B), the pulse width of the index output can have a significant variation.

Accordingly, the present disclosure further provides an optical encoder that adjusts emission light intensity of a light source corresponding to different longitudinal distances in conjunction with keeping a pulse width of the index output to be substantially identical by regulating a gain of index output.

SUMMARY

The present disclosure provides an optical encoder that keeps a pulse width of the index output to be substantially identical by arranging additional control photodiodes for turning on and turning off gain regulation of output signals of the index photodiode.

The present disclosure further provides an optical encoder with comparators having programmable hysteresis corresponding to a rotating speed of an encoding medium (indicating motor speed or shaft speed) so as to reduce the error state in increasing the rotating speed.

The present disclosure further provides an optical encoder with benefits of cost effective and time saving since it can be adapted to a wider operation frequency without re-investing new configurations for different rotating speeds.

The present disclosure provides an optical encoder including multiple hysteresis comparators and a frequency detector. Each of the multiple hysteresis comparators is configured to compare a couple of phase shifted signals among multiple phase shifted signals, which are generated based on a first input signal, a second input signal, a third input signal and a fourth input signal, using an operation hysteresis level. The frequency detector is configured to detect an input signal frequency according to at least one of the first input signal, the second input signal, the third input signal and the fourth input signal, and select the operation hysteresis level of each of the multiple hysteresis comparators according to the detected input signal frequency.

The present disclosure provides an optical encoder including an encoding medium, multiple hysteresis comparators and a frequency detector. Each of the multiple hysteresis comparators is configured to compare a couple of phase shifted signals among multiple phase shifted signals, which are generated based on a first input signal, a second input signal, a third input signal and a fourth input signal, using an operation hysteresis level. The frequency detector is configured to select the operation hysteresis level of each of the multiple hysteresis comparators corresponding to multiple predetermined frequency ranges associated with a rotating speed of the encoding medium.

The present disclosure further provides an optical encoder including an encoding medium, multiple hysteresis comparators and a frequency detector. Each of the multiple hysteresis comparators is configured to compare a couple of phase shifted signals among multiple phase shifted signals, which are generated based on a first input signal, a second input signal, a third input signal and a fourth input signal, using an operation hysteresis level. The frequency detector is configured to change the operation hysteresis level of each of the multiple hysteresis comparators in a step manner when a rotating speed of the encoding medium is progressively decreasing or increasing.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical encoder of the present disclosure is adaptable to a reflective type optical encoder that regulates emission intensity of a light source corresponding to a longitudinal distance (or Z distance) between an encoding medium and a light source to cause photocurrent outputted by the position photodiode to be substantially fixed. In the present disclosure, in order to cause a pulse width of an index pulse generated by the index photodiode to be fixed at the same time, gain regulation is further performed on the index voltage signal (e.g., generated from index photocurrent passing a trans-impedance amplifier). In addition, in order not to disturb the index pulse, the gain regulation is turned off within an interval during which the index pulse is generated. The gain regulation is turned on to maintain a reference value of the index signal to be within a predetermined range only within an interval during which the index pulse is not generated.

Figure 5:
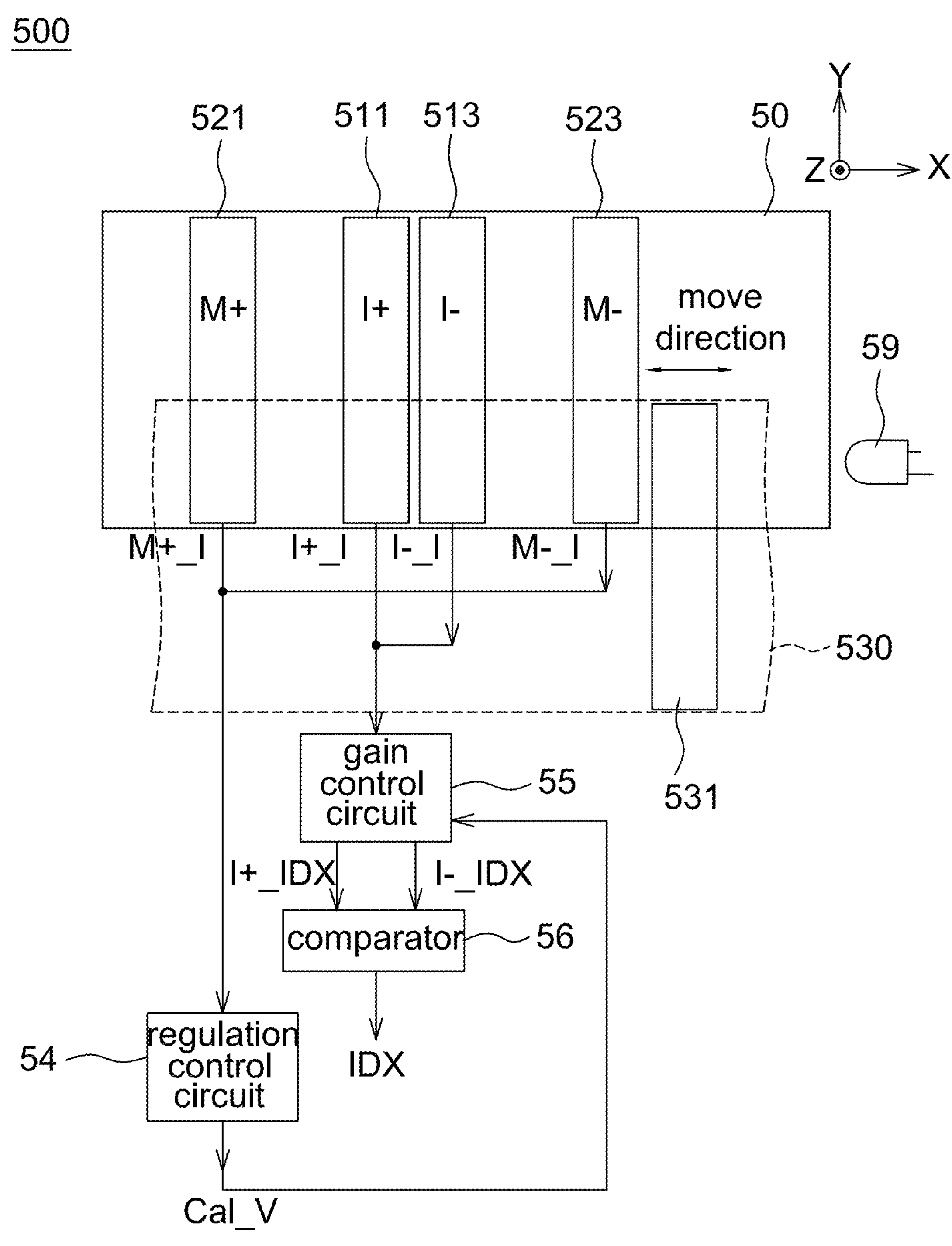
FIG. 5 is a schematic diagram of an optical encoder according to one embodiment of the present disclosure.

Please refer to FIG. 5, it is a schematic diagram of an optical encoder 500 according to one embodiment of the present disclosure. The optical encoder 500 includes an encoding medium 530 (only a part being shown) and a substrate 50 arranged opposite to each other. The encoding medium 530 is, for example, a code disk or a code strip that rotates or linearly moves with respect to the substrate 50 depending on different applications. For example, FIG. 5 shows that the substrate 50 has a relative movement with respect to the encoding medium 530 in a first direction (e.g., X direction). In the relative movement, at least one of the encoding medium 530 and the substrate 50 is moving.

The substrate 50 has a longitudinal distance from the encoding medium 530 in the Z direction. The optical encoder 500 further includes a light source 59 for illuminating the encoding medium 530 to generate modulated light to be reflected to the light sensing device on the substrate 50. In the present disclosure, the light source 59 generates emission light of different intensity to illuminate the encoding medium 530 to keep modulated reflective light to have substantially identical intensity. The light source 59 is, for example, a light emitting diode, for emitting light of an identifiable spectrum, e.g., red light and/or infrared light.

The encoding medium 530 includes an index pattern 531. The index pattern 531 is a reflective surface (reflecting light of the light source 59) or a light absorbing surface (absorbing light of the light source 59) depending on different applications. The relative movement between the encoding medium 530 and the substrate 50 along the first direction causes the index pattern 531 to periodically (under fixed moving speed) move across the light sensing device of the substrate 50. It should be mentioned that the encoding medium 530 further includes the position pattern (or called AB pattern) arranged at a different track from the index pattern 531. Since the position pattern is known to the art and not a main objective of the present disclosure, details thereof are not described herein.

The substrate 50 is selected from a printed circuit board (PCB) or a flexible substrate without particular limitations. The light sensing device on the substrate 50 includes a first index photodiode 511 (shown as I+), a second index photodiode 513 (shown as I−), a first control photodiode 521 (shown as M+) and a second control photodiode 523 (shown as M−). The first index photodiode 511 and the second index photodiode 513 are arranged between the first control photodiode 521 and the second control photodiode 523 along the first direction. The first control photodiode 521 and the second control photodiode 523 are used to define a range of the first index photodiode 511 and the second index photodiode 513 on the substrate 50.

It should be mentioned that the light sensing device on the substrate 50 further includes position photodiodes (or called AB photodiodes) for detecting reflective light from the position pattern on the encoding medium 530. Since the position photodiodes are known to the art and not a main objective of the present disclosure, details thereof are not described herein.

In one aspect, a sensing area of the first control photodiode 521 and the second control photodiode 523 is identical to a sensing area of each of the first index photodiode 511 and the second index photodiode 513. Although FIG. 5 shows that the sensing areas of the first index photodiode 511, the second index photodiode 513, the first control photodiode 521 and the second control photodiode 523 are rectangles and have the same shape, it is only intended to illustrate but not to limit the present disclosure. In other aspects, to improve output signals of photodiodes, a shape of the sensing areas of these photodiodes is changeable, e.g., changing to a trapezoid or a triangle, but not limited thereto.

In one aspect, the first control photodiode 521 and the second control photodiode 523 as well as the first index photodiode 511 and the second index photodiode 513 are corresponding to the same track (e.g., same radial position) of the encoding medium 530. Meanwhile, the first control photodiode 521 and the second control photodiode 523 are corresponding to different tracks of the encoding medium 530 from the position photodiodes on the substrate 50. In this aspect, said same track refers to that in the relative movement along the first direction, the index pattern 531 sequentially moves across the first control photodiode 521, the first index photodiode 511, the second index photodiode 513 and the second control photodiode 523, or vice versa.

Figure 7:
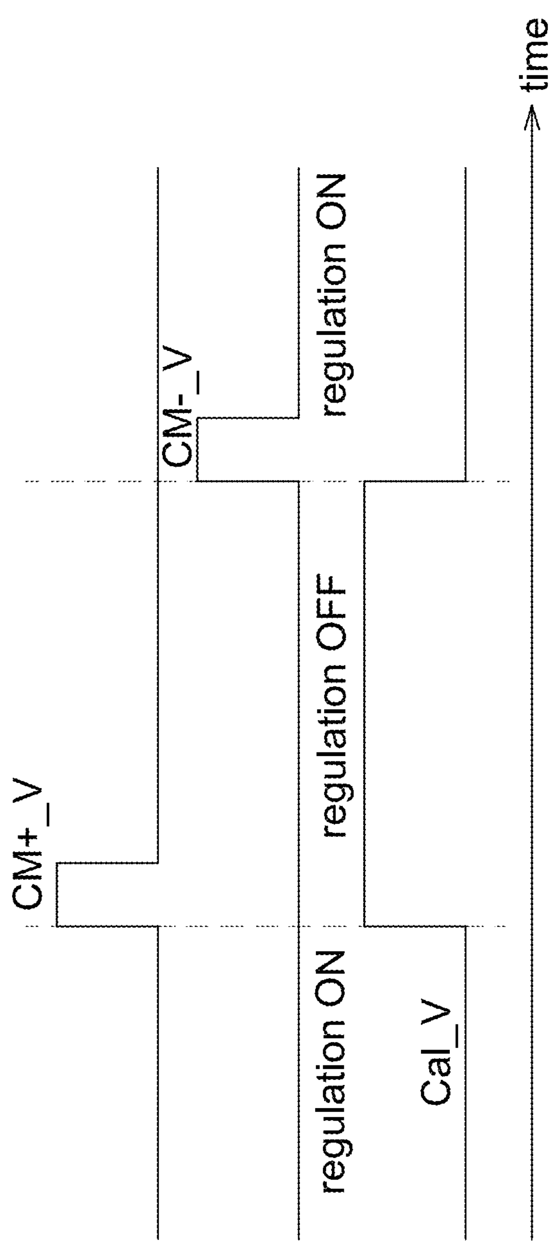
FIG. 7 is a signal timing diagram of a regulation control circuit of an optical encoder according to one embodiment of the present disclosure.

Although FIG. 5 shows that the height of the first control photodiode 521 and the second control photodiode 523 along the Y direction is identical to the height of the first index photodiode 511 and the second index photodiode 513, it is only intended to illustrate but not to limit the present disclosure. In other aspects, the height of the first control photodiode 521 and the second control photodiode 523 along the Y direction is different from the height of the first index photodiode 511 and the second index photodiode 513. When the index pattern 531 is moving across the first control photodiode 521 or the second control photodiode 523, the sensing area of the first control photodiode 521 or the second control photodiode 523 is totally or partially overlapped (or covered) by the index pattern 531 without particular limitations as long as regulation control signals CM+_V and CM−V as shown in FIG. 7 are generated.

In one aspect, distances between the first control photodiode 521 and the first index photodiode 511 as well as between the second control photodiode 523 and the second index photodiode 513 along the first direction are larger than or equal to a width of the index pattern 531 along the first direction, but said distances are not particularly limited.

Figure 8:
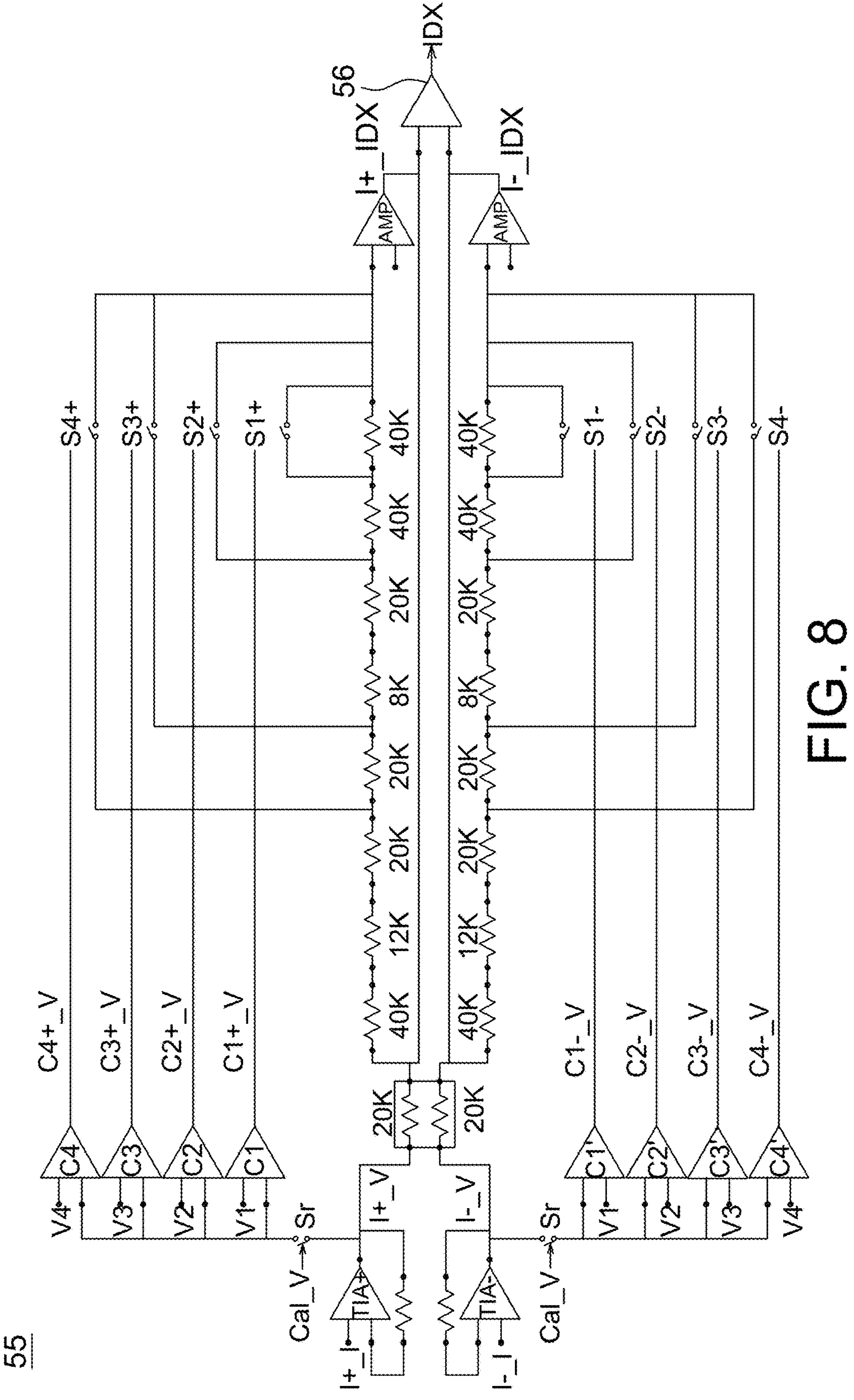
FIG. 8 is a circuit diagram of a gain control circuit of an optical encoder according to one embodiment of the present disclosure.

The first index photodiode 511 and the second index photodiode 513 are adjacent to each other in the first direction, and respectively generate index signals I+_I and I−_I, wherein I+_I and I−_I are current signals. After passing the trans-impedance amplifiers TIA+ and TIA− (as shown in FIG. 8), index voltage signals I+_V and I−_V are respectively generated. In the present disclosure, since the index current signals I+_I and I−_I as well as the index voltage signals I+_V and I−_V are generated by current-voltage conversion of the trans-impedance amplifiers and have corresponding values according to the parameter of the trans-impedance amplifiers, for simplification purposes the signals I+_V and I−_V as well as the signals I+_I and I−_I are all called index signals indicating that they are generated by index photodiodes 511 and 513.

Figure 6:
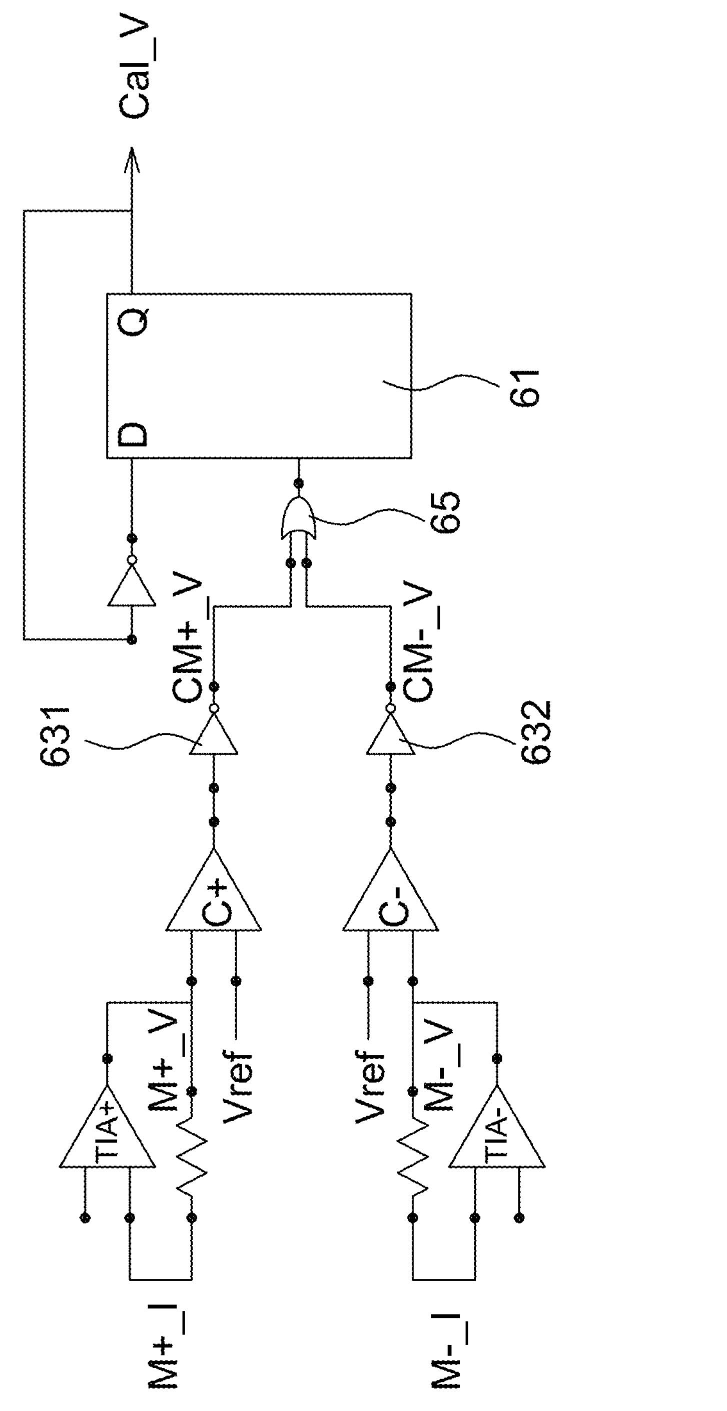
FIG. 6 is a circuit diagram of a regulation control circuit of an optical encoder according to one embodiment of the present disclosure.

The first control photodiode 521 generates a first control signal M+_I. The second control photodiode 523 generates a second control signal M−_I. Similarly, M+_I and M−_I are current signals. After passing the trans-impedance amplifiers TIA+ and TIA− (as shown in FIG. 6), control voltage signals M+_V and M−_V are respectively generated. In the present disclosure, since the control current signals M+I and M−I as well as the control voltage signals M+_V and M-V are generated by current-voltage conversion of the trans-impedance amplifiers and have corresponding values according to the parameter of the trans-impedance amplifiers, for simplification purposes the signals M+_V and M−_V as well as the signals M+_I and M−I are all called control signals indicating that they are generated by control photodiodes 521 and 523.

The optical encoder 500 further includes a gain control circuit 54 electrically connected to the first index photodiode 511 and the second index photodiode 513 so as to receive the index current signals I+_I and I−_I. The gain control circuit 55 amplifies the index voltage signals I+_V and I−_V using a gain. For example, when the signal intensity of the index signals I+_I and I−_I (or I+_V and I−_V) is larger (corresponding to stronger emission light), the gain is smaller; on the contrary, when the signal intensity of the index signals I+_I and I−_I (or I+_V and I−_V) is smaller (corresponding to weaker emission light), the gain is larger. In this way, the amplified index signals I+_IDX and I−_IDX (referring to FIG. 8) is maintained within a predetermined range.

Figure 3A:
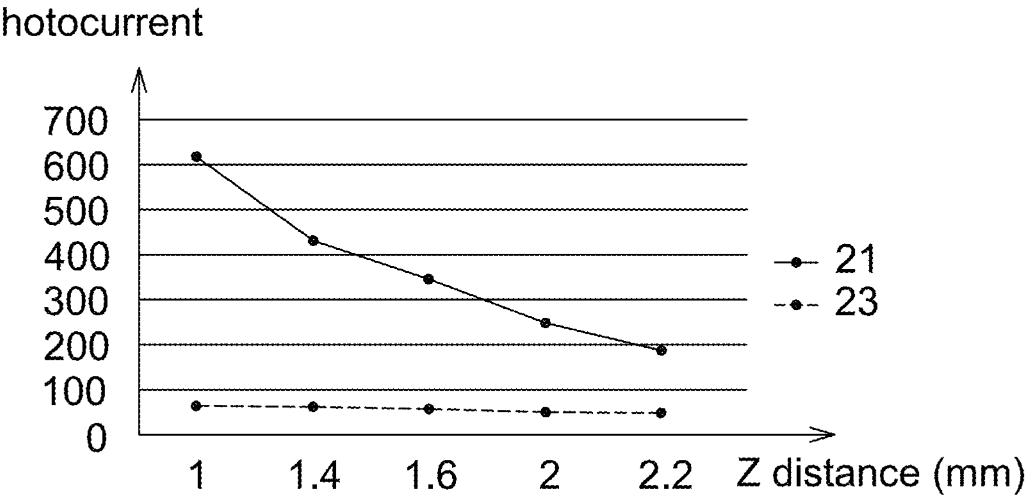
FIG. 3A is a schematic diagram of output photocurrents of the position photodiode and the index photodiode under different longitudinal distances of the optical encoder of FIGS. 1 and 2, wherein the light source intensity is not adjusted corresponding to the longitudinal distances.
Figure 3B:
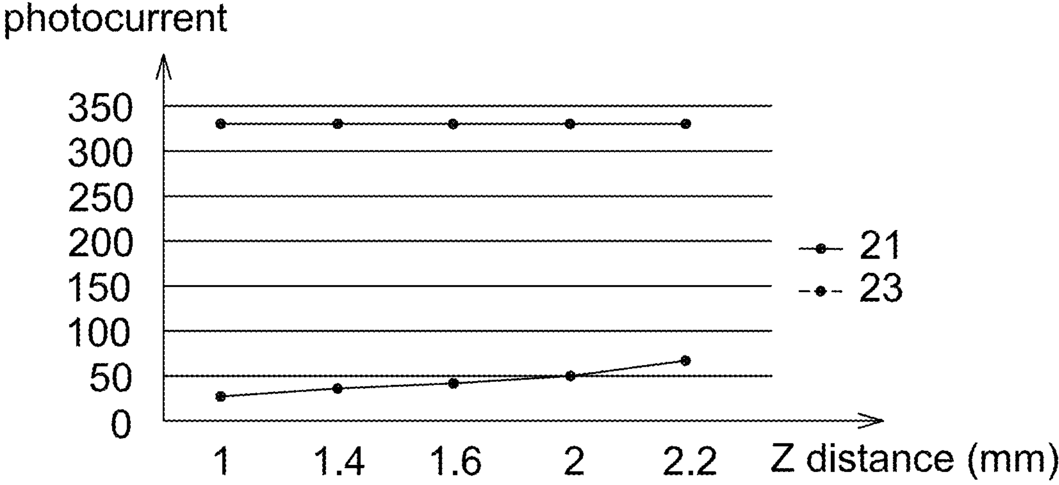
FIG. 3B is a schematic diagram of output photocurrents of the position photodiode and the index photodiode under different longitudinal distances of the optical encoder of FIGS. 1 and 2, wherein the light source intensity is adjusted corresponding to the longitudinal distances.

Please refer to FIG. 8, it is a circuit diagram of a gain control circuit 55 of an optical encoder 500 according to one embodiment of the present disclosure. The index signals I+_V and I−_V respectively outputted by TIA+ and TIA− are compared (e.g., using comparators C1 to C4 and C1' to C4') with multiple thresholds (e.g., shown as V1 to V4 in FIG. 8, wherein V1<V2<V3<V4) to change the gain in a step manner. For example, when I+_V (or I−_V) is larger than the predetermined voltage V4 (e.g., under larger longitudinal distance, referring to FIG. 3B), voltages C1+_V to C4+_V (or C1−_V to C4−_V) outputted by the comparators C1 to C4 (or C1' to C4') are at a high level so as to conduct multiple switches S1 to S4 to generate a smaller gain. For example, when I+_V (or I−_V) is smaller than the predetermined voltage V1 (e.g., under smaller longitudinal distance, referring to FIG. 3B), voltages C1+_V to C4+_V (or C1−_V to C4−_V) outputted by the comparators C1 to C4 (or C1' to C4') are at a low level so as to disconnect multiple switches S1 to S4 to generate a larger gain.

That is, in the aspect shown in FIG. 8, the gain control circuit 55 includes multiple cascaded resistors (shown as 9 resistors, but not limited to) and multiple bypass paths (shown as 4 paths, but not limited to). The multiple bypass paths respectively bypass at least one of the multiple resistors. For example, the comparison output of the index signals I+_V and I−_V compared with multiple voltage thresholds V1 to V4 are respectively used to connect or disconnect the multiple bypass paths via the switches S1 to S4. When the voltages C1+_V to C4+_V (and C1−_V to C4−_V) are at a high level, the corresponding switches S1 to S4 are conducted; whereas, when the voltages C1+_V to C4+_V (and C1−_V to C4−_V) are at a low level, the corresponding switches S1 to S4 are disconnected. In another aspect, the connection and disconnection of the multiple switches S1 to S4 are set oppositely corresponding to high or low levels.

The optical encoder 500 further includes a regulation control circuit 54 electrically connected to the first control photodiode 521 and the second control photodiode 523 so as to receive the first control signal M+I and the second control signal M−_I. The regulation control circuit 54 outputs a regulation control signal Cal_V to the gain control circuit 55 according to the first control signal M+I and the second control signal M−I to turn on or turn off gain regulation of the gain control circuit 55.

Please refer to FIG. 6, it is a circuit diagram of a regulation control circuit 54 of an optical encoder 500 according to one embodiment of the present disclosure. For example, when the index pattern 531 moves in the first direction (leftward or rightward in FIG. 5) to be opposite to the first control photodiode 521, the first control photodiode 521 is overlapped with the index pattern 531 and generates a first control signal M+_V having a low level; and when the index pattern 531 moves in the first direction (leftward or rightward in FIG. 5) to be opposite to the second control photodiode 523, the second control photodiode 523 is overlapped with the index pattern 531 and generates a second control signal M−_V having a low level.

After the first control signal M+_V passes a comparator C+ and an inverter 631, a first regulation control signal CM+_V (e.g., referring to FIG. 6) is generated to be inputted into one input terminal of an OR gate 65. After the second control signal M-V passes a comparator C− and an inverter 632, a second regulation control signal CM−_V (e.g., referring to FIG. 6) is generated to be inputted into another input terminal of the OR gate 65.

In the present disclosure, the first regulation control signal CM+_V and the second regulation control signal CM−_V are the output after being compared and inverted from the first control signal M+_V and the second control signal M−_V, and thus are corresponding to the first control signal M+_V and the second control signal M−_V based on the parameter of the comparators C+ and C− as well as the inverters 631 and 632. For simplification purposes, the first regulation control signal CM+_V and the second regulation control signal CM−V are also respectively called the first control signal and the second control signal indicating that they are associated with the first control photodiode 521 and the second control photodiode 523. For example, in one aspect, the trans-impedance amplifiers TIA+ and TIA−, the comparators C+ and C−, the inverters 631 and 632 are arranged in the same conversion circuit, which receives the signals M+_I and M−_I and outputs signals CM+_V and CM−_V to the OR gate 65. High and low levels of the signals in FIG. 7 are changeable according to different circuit configuration.

The regulation control circuit 54 further includes a flip flop 61 connected to an output terminal of the OR gate 65 for changing (from High to Low or from Low to High) a voltage value of a regulation control signal Cal_V outputted by the regulation control circuit 54 according to the first control signal CM+_V and the second control signal CM−_V, as shown in FIG. 7. The voltage value (or voltage level) of the regulation control signal Cal_V is to turn on or turn off the gain regulation of the gain control circuit 55.

For example referring to FIGS. 5-7, when the index pattern 531 is moved to be within a region between the first control photodiode 521 and the second control photodiode 523 to cause the regulation control signal Cal_V to have a high voltage value (more specifically a level change), the regulation control circuit 54 turns off the gain regulation of the gain control circuit 55 within a first interval between the first control signal CM+_V and the second control signal CM−_V. When the index pattern 531 is moved to be outside the region between the first control photodiode 521 and the second control photodiode 523 to cause the regulation control signal Cal_V to have a low voltage value (e.g., a second interval outside the first interval), the regulation control circuit 54 turns on the gain regulation of the gain control circuit 55.

The gain control circuit 55 includes a control switch Sr that is used to turn on or turn off the gain regulation of the gain control circuit 55 according to the voltage value of the regulation control signal Cal_V.

In another aspect, according to a different circuit configuration, the gain regulation of the gain control circuit 55 is turned on when the regulation control signal Cal Vis at a low level (within the first interval), and the gain regulation of the gain control circuit 55 is turned off when the regulation control signal Cal_V is at a high level (outside the first interval).

Figure 4:
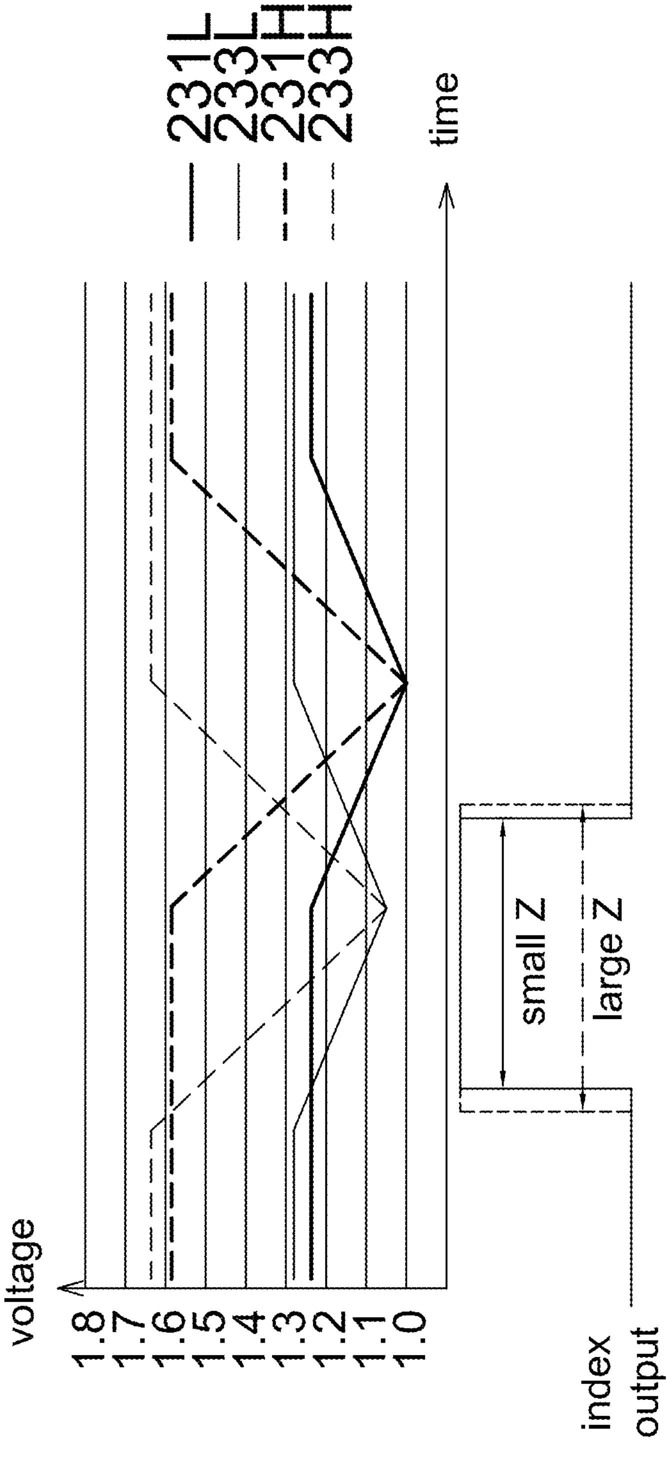
FIG. 4 is a schematic diagram of the index output corresponding to two different longitudinal distances of a conventional optical encoder.

Please refer to FIG. 8 again, the optical encoder 500 further includes a comparator 56 inside or outside the gain control circuit 55 without particular limitations. The comparator 56 receives two amplified index signals I+_IDX and I−_IDX, e.g., 531L and 533L or 531H and 533H shown in FIG. 9, outputted by the gain control circuit 55 so as to generate an index pulse IDX, wherein reference numerals 531L and 533L indicate two amplified index signals I+_IDX and I−_IDX when the substrate 50 (or light source 59) has a shorter longitudinal distance from the encoding medium 530; whereas, 531H and 533H indicate two amplified index signals I+_IDX and I−_IDX when the substrate 50 (or light source 59) has a longer longitudinal distance from the encoding medium 530. As the present disclosure further adopts the gain control circuit 55, compared to FIG. 4, the gain control circuit 55 shown in FIG. 9 causes 531L to be closer to 531H, and 533L to be closer to 533H.

Figure 9:
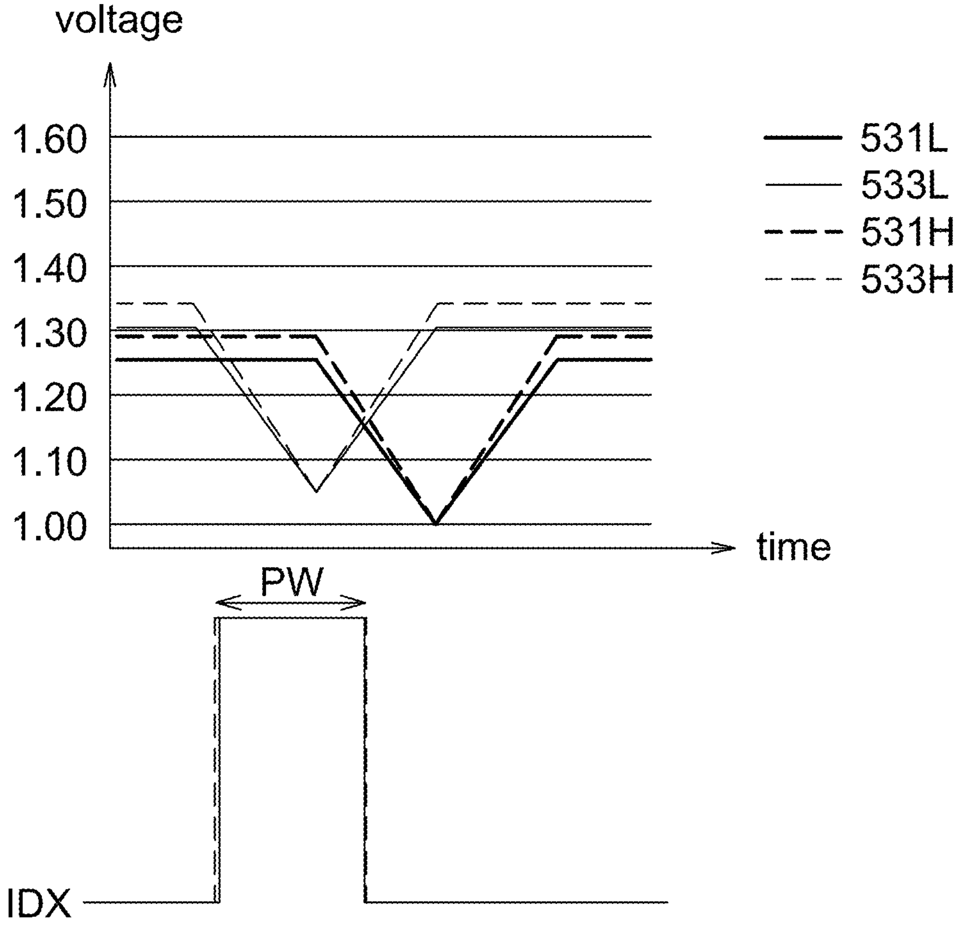
FIG. 9 is a schematic diagram of the index output corresponding to two different longitudinal distances of an optical encoder according to one embodiment of the present disclosure.

In the present disclosure, the gain regulation of the gain control circuit 55 is used to keep a pulse width PW of the index pulse IDX to be substantially similar as shown in FIG. 9. As mentioned above, the gain regulation of the gain control circuit 55 is turned off within an interval of the pulse width PW.

It should be mentioned that the values mentioned in the above embodiment, including resistors, voltage values, thresholds, a number of thresholds, a number of photodiodes, a number of switches, a number of comparators, a number of resistors, the spatial distance and the component shape, are only intended to illustrate but not to limit the present disclosure.

In the present disclosure, the gain regulation of the gain control circuit 55 is referred to conducting the control switch Sr by the regulation control signal Cal_V such that it is able to connect or disconnect the switches S1 to S4 based on the comparison result of comparators C1 to C4 and C1' to C4' so as to regulate a gain for amplifying index signals I+_V and I−_V.

Figure 1:
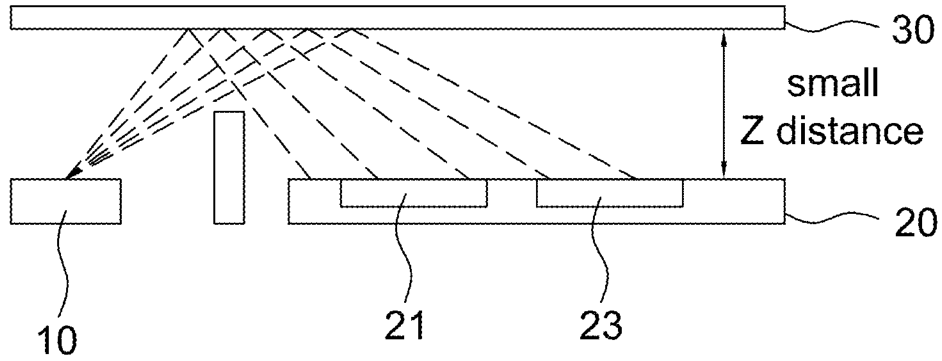
FIG. 1 is an operational schematic diagram of a conventional optical encoder under a smaller longitudinal distance.
Figure 2:
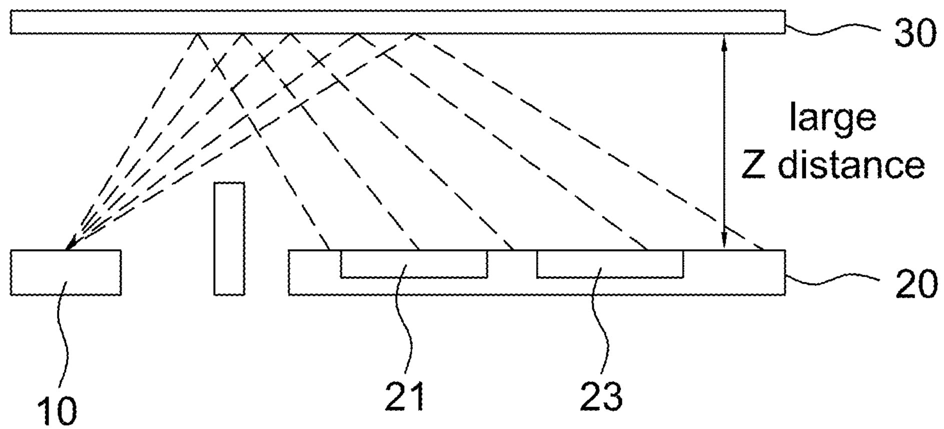
FIG. 2 is an operational schematic diagram of a conventional optical encoder under a larger longitudinal distance.

The present disclosure further provides an optical encoder for outputting interpolated output signals based on four input signals, which are generated by position photodiodes, e.g., element 21 shown in FIG. 2. The output performance of the optical encoder of this embodiment is optimized by controlling and changing hysteresis of multiple hysteresis comparators for generating the interpolated output signals according to a rotating speed of an encoding medium (e.g., element 530 shown in FIG. 5) to be detected by the optical encoder, wherein the rotating speed reflects a motor speed or a shaft speed, but not limited to.

Figure 10:
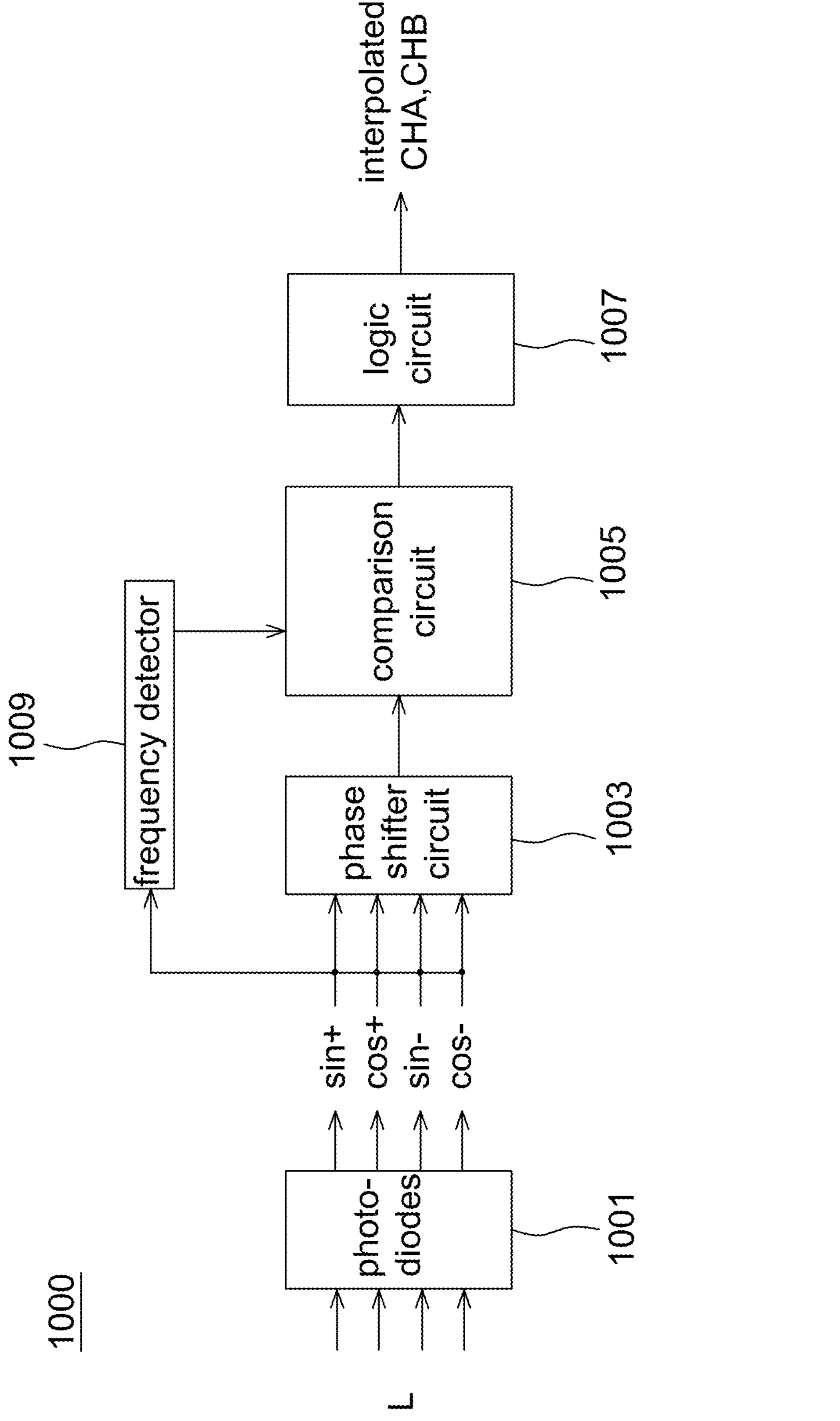
FIG. 10 is a block diagram of an optical encoder according to one embodiment of the present disclosure.

Please refer to FIG. 10, it is a block diagram of an optical encoder 1000 according to one embodiment of the present disclosure. The optical encoder 1000 includes photodiodes 1001, a phase shifter circuit 1003, a comparison circuit 1005 and a logic circuit 1007.

The photodiodes 1001 include four position photodiodes for detecting modulated light (e.g., shown as L in FIG. 10) from an encoding medium (e.g., element 530 shown in FIG. 2), and outputting four signals to be inputted into the phase shifter 1003, thus calling four signals herein.

For examples, the four input signals include a first input signal, a second input signal, a third input signal and a fourth input signal. The first input signal and the second input signal are phase quadrature, the first input signal and the third input signal are out of phase, and the second input signal and the fourth input signal are out of phase. In FIG. 10, the first input signal is shown as sin+, the second input signal is shown as cos+, the third input signal is shown as sin−, and the fourth input signal is shown as cos−, but the present disclosure is not limited thereto. For example, the four input signals are voltage signals which are converted and amplified by trans-impedance amplifier from photocurrent generated by the position photodiodes. Details of the four position photodiodes for generating the four input signals are known to the art and not a main objective of the present disclosure, and thus are not described herein.

The phase shifter circuit 1003 receives the four input signals, and outputs multiple phase shifted signals based on the four input signals, wherein a number of the multiple phase shifted signals is determined according to the interpolation factor of output signals, e.g., shown as CHA and CHB.

Figure 11:
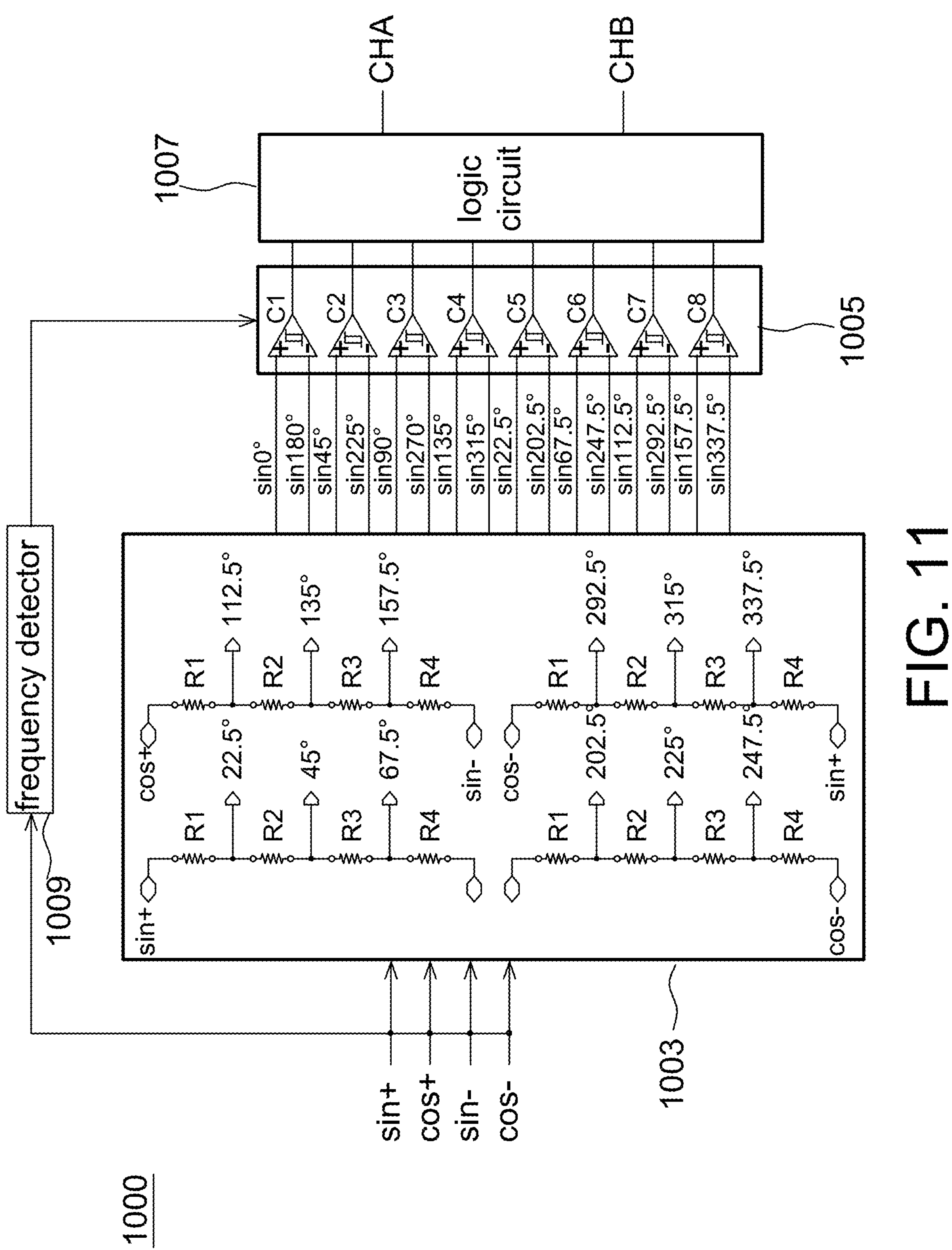
FIG. 11 is another block diagram of an optical encoder according to one embodiment of the present disclosure.

Referring to FIG. 11 together, in one aspect, the phase shifter circuit 1003 includes resistor string(s), e.g., including cascaded R1, R2, R3 and R4 as shown in FIG. 11, for generating the multiple phase shifted signals, e.g., shown as sin 0° to sin 337.5°. In one aspect, the phase shifter circuit 1003 includes one resistor string to generate the multiple phase shifted signals by receiving different input signals at two ends of the resistor string, e.g., switched by at least one switching device. In another aspect, the phase shifter circuit 1003 includes four resistor strings respectively receiving a different pair of input signals at two ends thereof as shown in FIG. 11. A number of cascaded resistors in the resistor string(s) is determined according to the required interpolation factor, e.g., some examples referring to U.S. Pat. No. 11,108,385 B1 assigned to the same assignee of the present application, and the full disclosure of which is incorporated herein by reference. FIG. 11 shows an example of generating 4-fold interpolation signals by using phase shifted signals sin 0° to sin 337.5° with a pitch 22.5°.

It should be mentioned that the phase shifter circuit 1003 is not limited to generate the multiple phase shifted signals using resistor string(s), which may be replaced by other known methods.

The comparison circuit 1005 includes multiple hysteresis comparators, e.g., shown as C1 to C8 in FIG. 11. A number of multiple hysteresis comparators is also determined according to the required interpolation factor. Each of the multiple hysteresis comparators compares a couple of phase shifted signals among the multiple phase shifted signals using an operation hysteresis level, i.e. currently being used. In the present disclosure, each of the multiple hysteresis comparators has a changeable operation hysteresis level, which is selected or set corresponding to a rotating speed of an encoding medium to be detected by the optical encoder 1000.

In one aspect, the rotating speed is determined according to a signal frequency of the four input signals sin+, cos+, sin− and cos−. For example, the signal frequency is determined by detecting, at time domain or frequency domain, at least one of the four input signals.

For example, the optical encoder 1000 further includes a frequency detector 1009 for detecting a signal frequency according to at least one of the first input signal, the second input signal, the third input signal and the fourth input signal. That is, the frequency detector 1009 receives at least one of the four input signals without being limited to receive all of the four input signals. The frequency detector 1009 is coupled to each of the multiple hysteresis comparators. The frequency detector 1009 is implemented by hardware and/or firmware, and selects the operation hysteresis level of each of the multiple hysteresis comparators according to the detected signal frequency. For example, the frequency detector 1009 changes a value of a resistor coupled between a non-inverted input terminal and an output terminal of each of the multiple hysteresis comparators to adjust the operation hysteresis level, but not limited to.

In the present disclosure, each of the multiple hysteresis comparators has at least two predetermined hysteresis levels to be selected by the frequency detector 1009 as the operation hysteresis level. The at least two predetermined hysteresis levels of each of the multiple hysteresis comparators are determined according to peak-to-peak voltages of the couple of phase shifted signals to be compared thereby because it is known that the multiple phase shifted signals generated by resistor string(s) have different peak-to-peak voltages that can degrade output performance of an interpolation circuit adopted in optical encoders.

Figure 12:
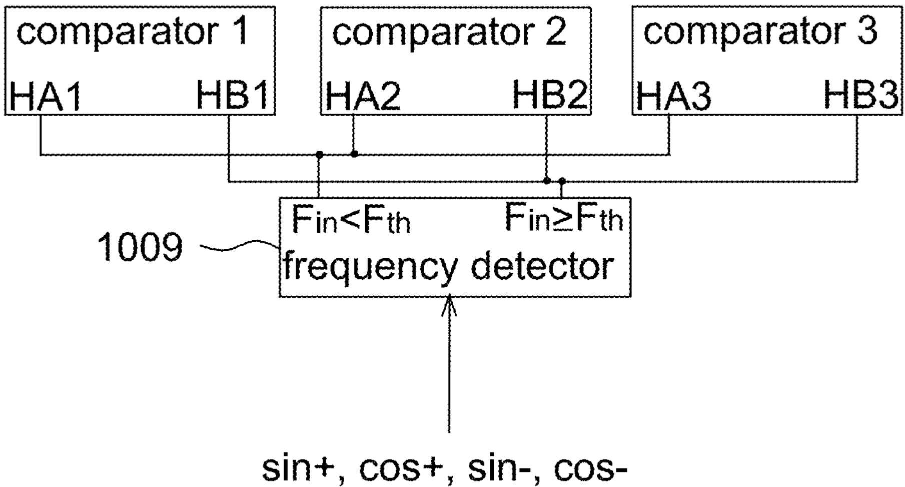
FIG. 12 is a schematic diagram of controlling hysteresis of comparators by a frequency detector according to one embodiment of the present disclosure.

Please refer to FIG. 12, it shows that each of the hysteresis comparators (e.g., shown as comparator 1, comparator 2 and comparator 3) has two hysteresis levels, e.g., shown as HA1&HB1 for comparator 1, HA2&HB2 for comparator 2 and HA3&HB3 for comparator 3. In this aspect, the frequency detector 1009 compares the detected signal frequency (e.g., shown as $F_{in}$) with at least one frequency threshold (e.g., shown as $F_{th}$) to select the operation hysteresis level. For example, when $F_{in}<F_{th}$, the frequency detector 1009 selects HA1, HA2 and HA3 as operation hysteresis levels of the comparator 1, comparator 2 and comparator 3, respectively; whereas when $F_{in}\geq F_{th}$, the frequency detector 1009 selects HB1, HB2 and HB3 as operation hysteresis levels of the comparator 1, comparator 2 and comparator 3, respectively. In the present disclosure, HA1, HA2 and HA3 are totally or partially different from one another, and HB1, HB2 and HB3 are totally or partially different from one another.

In one aspect, each of the multiple hysteresis comparators has more than two pre-set hysteresis levels, and the frequency detector 1009 is used to change the operation hysteresis level of each of the multiple hysteresis comparators every signal frequency step, e.g., every 100 KHz, but not limited to. Said signal frequency step is constant or non-constant frequency range.

Figure 13:
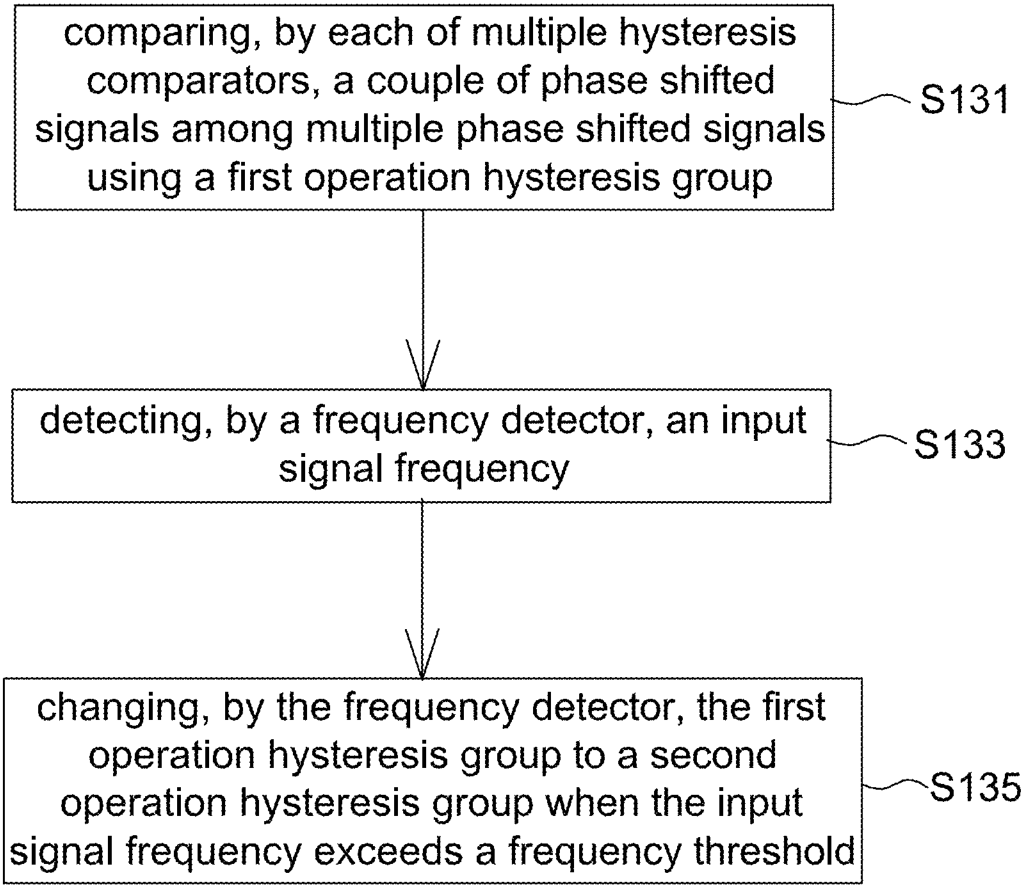
FIG. 13 is a flow chart of an operating method of an optical encoder according to one embodiment of the present disclosure.

Referring to FIG. 13, it is a flow chart of an operating method of an optical encoder 100 according to one embodiment of the present disclosure, including the steps of: comparing, by each of multiple hysteresis comparators, a couple of phase shifted signals among multiple phase shifted signals using a first operation hysteresis group (Step S131); detecting, by a frequency detector, an input signal frequency (Step S133); and changing, by the frequency detector, the first operation hysteresis group to a second operation hysteresis group when the detected input signal frequency exceeds a frequency threshold (Step S135).

Please refer to FIGS. 11 to 13 together, in Step S131, each of the hysteresis comparators compares a couple of phase shifted signals, e.g., comparator C1 comparing sin 0° and sin 180°; comparator C2 comparing sin 45° and sin 225°; comparator C3 comparing sin 90° and sin 270° . . . , using HA1, HA2 and HA3, respectively. It is appreciated that comparators C4 to C8 respectively have a corresponding first hysteresis level.

Step S133: The frequency detector 1009 detects an input signal frequency $F_{in}$ according to at least one of sin+, cos+, sin− and cos−. When the input signal frequency $F_{in}$ is still lower than a frequency threshold $F_{th}$, the frequency detector 1009 does not change the operation hysteresis level currently being used in each of the multiple hysteresis comparators.

Step S135: When the input signal frequency $F_{in}$ is higher than or equal to the frequency threshold $F_{th}$, the frequency detector 1009 respectively changes HA1 to HB1, changes HA2 to HB2, changes HA3 to HB3 and also changes first hysteresis levels of other comparators C3 to C8 to second hysteresis levels.

On the other hand, if the rotating speed is progressively decreased to be lower than the frequency threshold $F_{th}$, the frequency detector 1009 changes the second operation hysteresis group to the first operation hysteresis group.

More specifically, the first operation hysteresis group (e.g., including HA1, HA2, HA3 . . . ) is associated with a first frequency range (e.g., 50-100 KHZ, but not limited to), and the second operation hysteresis group (e.g., including HB1, HB2, HB3 . . . ) is associated with a second frequency range (e.g., 100-200 KHZ, but not limited to) different from the first frequency range. The suitable operation hysteresis group corresponding to each frequency range is previously determined and set before the shipment of the optical encoder 1000.

As mentioned above, the input signal frequency $F_{in}$ is determined according to a rotating speed of an encoding medium (e.g., indicating a motor speed or shaft speed) to be detected by the optical encoder 1000. If a range of the rotating speed is larger, more hysteresis steps are pre-set to have fine tuning ability.

The logic circuit 1007 receives the multiple phase shifted signals (e.g., shown as sin 0° to sin) 337.5° from the comparison circuit 1005 and generates interpolated output signals CHA and CHB. For example, the logic circuit 1007 includes multiple XOR gates to generate N-fold interpolation signals, e.g., referring to U.S. Pat. No. 11,108,385 B1 assigned to the same assignee of the present application as an example.

It is appreciated that although FIG. 12 shows two groups of hysteresis levels which are changeable by the frequency detector 1009, the present disclosure is not limited thereto. In other aspects, each of the hysteresis comparators 1 to 3 is pre-set with more than two predetermined hysteresis levels to be selected or calibrated by the frequency detector 1009, e.g., by comparing with multiple frequency thresholds, with constant or non-constant frequency separations.

It should be mentioned that although the frequency detector 1009 is shown as an independent circuit in FIGS. 10-12, the present disclosure is not limited thereto. In other aspects, the frequency detector 1009 is embedded in the phase shifter circuit 1009 or the comparison circuit 1005 without particular limitations.

It is appreciated that a number of comparators, phase shifted signals and resistors in a resistor string is determined according to an interpolation factor of the optical encoder 1000. In the present disclosure, a number of selectable hysteresis levels is determined according to an operable range of the motor/shaft to be detected by as well as the acceptable performance of the optical encoder.

As mentioned above, the error state of conventional optical encoders is increased when a motor/shaft speed is increased. Accordingly, the present disclosure further provides an optical encoder capable of adjusting hysteresis of every comparator corresponding to different input signal frequencies (e.g., FIGS. 10-12) that can effectively reduce the error state at different motor/shaft speeds.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:

multiple hysteresis comparators, each being configured to compare a couple of phase shifted signals among multiple phase shifted signals, which are generated based on a first input signal, a second input signal, a third input signal and a fourth input signal, using an operation hysteresis level; and a frequency detector, configured to detect an input signal frequency according to at least one of the first input signal, the second input signal, the third input signal and the fourth input signal, and select the operation hysteresis level of each of the multiple hysteresis comparators according to the detected input signal frequency.

2. The optical encoder as claimed in claim 1, wherein the multiple phase shifted signals are generated by four resistor strings each configured to receive a coupled of the first input signal, the second input signal, the third input signal and the fourth input signal.

3. The optical encoder as claimed in claim 1, wherein each of the multiple hysteresis comparators has at least two predetermined hysteresis levels configured to be selected as the operation hysteresis level according to the detected input signal frequency.

4. The optical encoder as claimed in claim 3, wherein the at least two predetermined hysteresis levels of each of the multiple hysteresis comparators are determined according to peak-to-peak voltages of the couple of phase shifted signals to be compared by the multiple hysteresis comparators.

5. The optical encoder as claimed in claim 1, wherein the operation hysteresis level is selected by comparing the detected input signal frequency, which is determined according to a rotating speed of an encoding medium, with multiple predetermined frequency ranges.

6. The optical encoder as claimed in claim 5, wherein the rotating speed is a motor speed or a shaft speed to be detected by the optical encoder.

7. The optical encoder as claimed in claim 1, wherein the first input signal and the second input signal are phase quadrature, the first input signal and the third input signal are out of phase, and the second input signal and the fourth input signal are out of phase.

8. An optical encoder, comprising:

an encoding medium;

multiple hysteresis comparators, each being configured to compare a couple of phase shifted signals among multiple phase shifted signals, which are generated based on a first input signal, a second input signal, a third input signal and a fourth input signal, using an operation hysteresis level; and a frequency detector, configured to select the operation hysteresis level of each of the multiple hysteresis comparators corresponding to multiple predetermined frequency ranges associated with a rotating speed of the encoding medium.

9. The optical encoder as claimed in claim 8, wherein the multiple phase shifted signals are generated by four resistor strings each configured to receive a coupled of the first input signal, the second input signal, the third input signal and the fourth input signal.

10. The optical encoder as claimed in claim 8, wherein each of the multiple hysteresis comparators has at least two predetermined hysteresis levels configured to be selected as the operation hysteresis level.

11. The optical encoder as claimed in claim 10, wherein the at least two predetermined hysteresis levels of each of the multiple hysteresis comparators are determined according to peak-to-peak voltages of the couple of phase shifted signals to be compared by the multiple hysteresis comparators.

12. The optical encoder as claimed in claim 8, wherein the multiple predetermined frequency ranges are stepped frequency ranges.

13. The optical encoder as claimed in claim 8, wherein the first input signal and the second input signal are phase quadrature, the first input signal and the third input signal are out of phase, and the second input signal and the fourth input signal are out of phase.

14. The optical encoder as claimed in claim 8, wherein the rotating speed is a motor speed or a shaft speed to be detected by the optical encoder.

15. An optical encoder, comprising:

an encoding medium;

multiple hysteresis comparators, each being configured to compare a couple of phase shifted signals among multiple phase shifted signals, which are generated based on a first input signal, a second input signal, a third input signal and a fourth input signal, using an operation hysteresis level; and a frequency detector, configured to change the operation hysteresis level of each of the multiple hysteresis comparators in a step manner when a rotating speed of the encoding medium is progressively decreasing or increasing.

16. The optical encoder as claimed in claim 15, wherein the rotating speed is determined according to at least one of the first input signal, the second input signal, the third input signal and the fourth input signal from photodiodes that detect light from the encoding medium.

17. The optical encoder as claimed in claim 15, wherein the multiple phase shifted signals are generated by four resistor strings each configured to receive a coupled of the first input signal, the second input signal, the third input signal and the fourth input signal.

18. The optical encoder as claimed in claim 15, wherein the first input signal and the second input signal are phase quadrature, the first input signal and the third input signal are out of phase, and the second input signal and the fourth input signal are out of phase.

19. The optical encoder as claimed in claim 15, wherein each of the multiple hysteresis comparators has at least two predetermined hysteresis levels configured to be changed according to the rotating speed.

20. The optical encoder as claimed in claim 15, wherein the rotating speed is a motor speed or a shaft speed to be detected by the optical encoder.

* * * * *